United States Patent
Harada et al.

(10) Patent No.: US 8,988,361 B2
(45) Date of Patent: Mar. 24, 2015

(54) WRITING APPARATUS

(75) Inventors: Haruo Harada, Ebina (JP); Taijyu Gan, Ebina (JP); Hiroshi Arisawa, Ebina (JP); Yasunori Okano, Tokyo (JP); Chisato Urano, Ebina (JP); Takashi Morikawa, Ebina (JP); Atsushi Hirano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1047 days.

(21) Appl. No.: 12/534,350

(22) Filed: Aug. 3, 2009

(65) Prior Publication Data
US 2010/0245291 A1 Sep. 30, 2010

(30) Foreign Application Priority Data
Mar. 26, 2009 (JP) .................................. 2009-077584

(51) Int. Cl.
*G06F 3/041* (2006.01)
*G06F 3/0354* (2013.01)
*G06F 3/042* (2006.01)

(52) U.S. Cl.
CPC ............ *G06F 3/03545* (2013.01); *G06F 3/042* (2013.01)
USPC ............. 345/173; 345/87; 345/88; 178/18.01

(58) Field of Classification Search
CPC ..... G09G 3/22; G09G 3/3406; G09G 3/3629; G09G 3/3651; G09G 2300/0456; G09G 2300/046; G09G 2300/0486; G09G 2320/0257; G06F 3/0412
USPC .............. 345/156–158, 173, 179–183, 87–88
See application file for complete search history.

(56) References Cited

U.S. PATENT DOCUMENTS

| 5,461,400 A | 10/1995 | Ishii et al. |
| 5,548,420 A * | 8/1996 | Koshimizu et al. ............. 349/21 |
| 5,903,296 A * | 5/1999 | Shimizu et al. ............... 347/139 |
| 6,600,473 B1 * | 7/2003 | Kobayashi et al. ............. 345/97 |
| 6,806,924 B2 * | 10/2004 | Niiyama et al. ................ 349/72 |
| 7,046,311 B2 * | 5/2006 | Kobayashi et al. ............... 349/2 |
| 7,116,316 B2 * | 10/2006 | Jelinek et al. ................ 345/180 |

(Continued)

FOREIGN PATENT DOCUMENTS

| EP | 745963 A1 * | 12/1996 |
| JP | A-64-072673 | 3/1989 |

(Continued)

OTHER PUBLICATIONS

Japanese Office Action issued in Japanese Patent Application No. 2009-077584 dated Feb. 22, 2011 (with translation).

*Primary Examiner* — Jason Mandeville
(74) *Attorney, Agent, or Firm* — Oliff PLC

(57) ABSTRACT

A writing apparatus includes: a voltage application unit that applies a voltage to a display medium whose display changes according to an irradiation of light and an applied voltage; an optical output unit that irradiates light toward the display medium; and a controller that (i) receives a position signal that has been output from an apparatus upon contact with an input device, the position signal indicating a position of the contact with the input device, (ii) specifies, based on the received position signal, a position on the display medium at which a display is to be changed, and (iii) controls the optical output unit so that light is irradiated toward the specified position on the display medium for a predetermined time period.

9 Claims, 7 Drawing Sheets

(56) References Cited

U.S. PATENT DOCUMENTS

| | | | |
|---|---|---|---|
| 2002/0000528 A1* | 1/2002 | Imai | 250/580 |
| 2003/0071958 A1* | 4/2003 | Wu et al. | 349/156 |
| 2003/0076466 A1* | 4/2003 | Ozawa et al. | 349/113 |
| 2004/0119933 A1* | 6/2004 | Harada et al. | 349/175 |
| 2005/0253801 A1 | 11/2005 | Kobayashi | |
| 2007/0046595 A1* | 3/2007 | Gan et al. | 345/87 |
| 2008/0055266 A1 | 3/2008 | Harada et al. | |
| 2009/0153517 A1* | 6/2009 | Liu et al. | 345/173 |
| 2010/0243341 A1* | 9/2010 | Harada et al. | 178/18.06 |

FOREIGN PATENT DOCUMENTS

| | | |
|---|---|---|
| JP | A-05-203927 | 8/1993 |
| JP | A-11-237644 | 8/1999 |
| JP | A-2003-186052 | 7/2003 |
| JP | A-2005-321736 | 11/2005 |
| JP | A-2007-331339 | 12/2007 |
| JP | A-2008-059254 | 3/2008 |

* cited by examiner

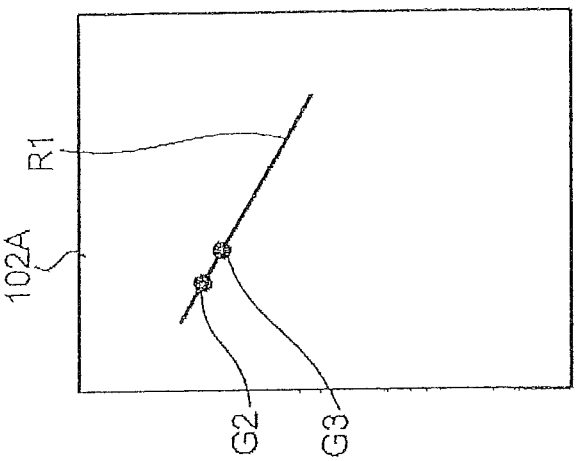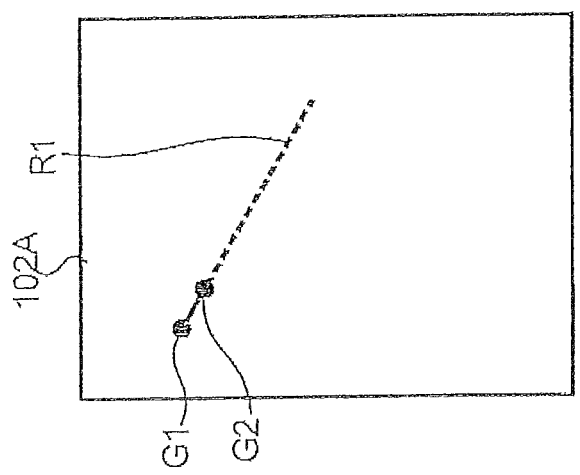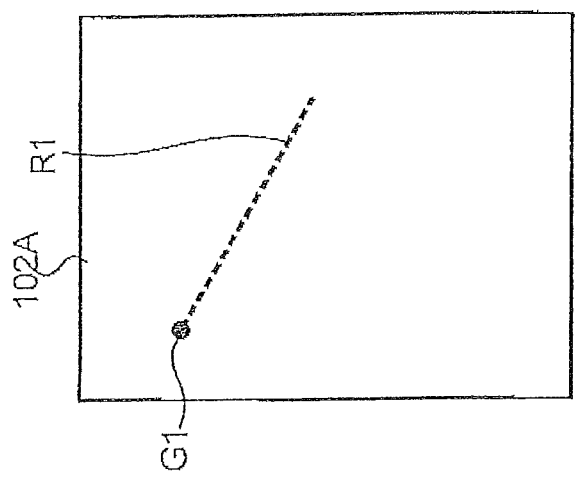

WRITING APPARATUS

CROSS-REFERENCE TO RELATED APPLICATIONS

This application claims priority under 35 USC 119 from a Japanese patent application No. 2009-077584 filed on Mar. 26, 2009.

BACKGROUND

1. Technical Field

The present invention relates to a writing apparatus.

2. Related Art

An optical writing type of display medium that includes a liquid crystal layer having cholesteric liquid crystal, a photosensitive layer that generates a charge upon reacting to light, and electrodes between which the liquid crystal layer and the photosensitive layer are sandwiched, is known. In this display medium, when a voltage is applied to the electrodes and light is irradiated onto the display medium, a change occurs in the orientational state of the liquid crystal at the position that was irradiated by the light, and an image is displayed according to the irradiation of light.

SUMMARY

The present invention provides a user to reliably write an image on a display medium that displays an image according to the irradiation of light.

According to one aspect of the invention, there is provided a writing apparatus includes: a voltage application unit that applies a voltage to a display medium whose display changes according to an irradiation of light and an applied voltage; an optical output unit that irradiates light toward the display medium; and a controller that (i) receives a position signal that has been output from an apparatus upon contact with an input device, the position signal indicating a position of the contact with the input device, (ii) specifies, based on the received position signal, a position on the display medium at which a display is to be changed, and (iii) controls the optical output unit so that light is irradiated toward the specified position on the display medium for a predetermined time period.

BRIEF DESCRIPTION OF THE DRAWINGS

An exemplary embodiment of the present invention will be described in detail based on the following figures, wherein:

FIGS. 13A to 13C are diagrams for describing operations of the exemplary embodiment.

DETAILED DESCRIPTION

1. Exemplary Embodiment

Figure 1:
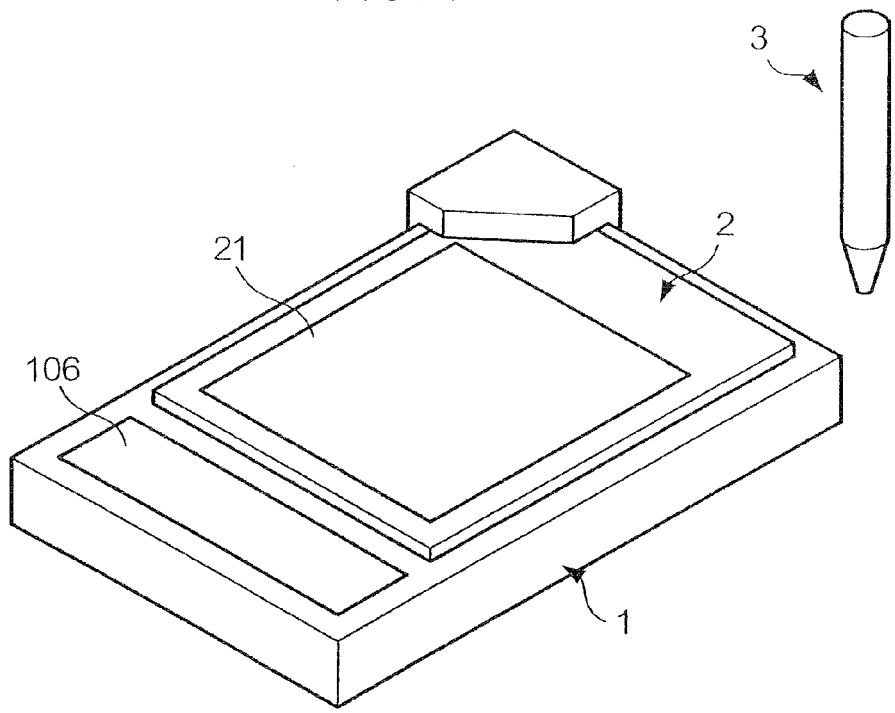
FIG. 1 is a diagram showing apparatuses in a system according to an exemplary embodiment of the present invention.

FIG. 1 is a schematic view of the exterior of a writing apparatus 1, a display apparatus 2, and a writing utensil 3 in a system according to an exemplary embodiment of the present invention.

The display apparatus 2 is a reflective type of display apparatus that displays an image by reflecting external light such as light from a lighting apparatus or sunlight. The display apparatus 2 is rectangular and has a plate shape, and includes a display medium 21. The display medium 21 has a stacked configuration including display layers having cholesteric liquid crystal, photosensitive layers that generate a charge upon reacting to light, and conductive layers between which the display layers and the photosensitive layers are sandwiched.

In the display apparatus 2, when light is irradiated from the writing apparatus 1 while a voltage is being applied to the conductive layers, a change occurs in the orientational state of the cholesteric liquid crystal at the position that is irradiated by light. Then, in accordance with the irradiation of light, the display layers are divided into a portion that transmits external light and a portion that reflects external light, and thus an image is displayed.

The writing utensil 3 is a so-called stylus pen, and is an input device (operator) that is used in the case of designating a portion of the display medium 21 in which the display is to be changed. Since the tip portion of the writing utensil 3 is brought into contact with the surface of the display medium 21, the tip portion has a curved face so as to not damage the display medium 21.

The writing apparatus 1 is an apparatus for causing an image to be displayed on the display apparatus 2 by writing the image onto the display apparatus 2. The writing apparatus 1 includes terminals that are electrically connected to the conductive layers of the display apparatus 2, and an apparatus for irradiating light onto the display medium 21. The writing apparatus 1 irradiates light onto the display apparatus 2 while applying a voltage to the conductive layers of the display medium 21 via the terminals, thereby causing the display apparatus 2 to display an image.

1-1. Configuration of Display Apparatus 2

Figure 2:
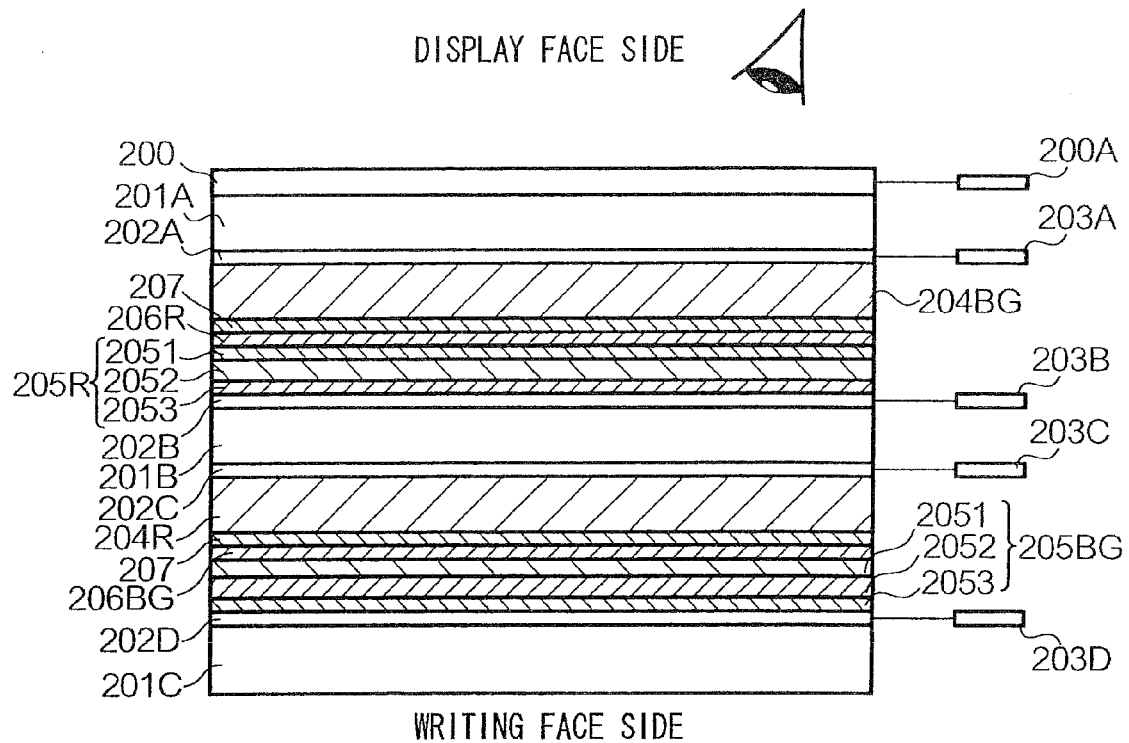
FIG. 2 is a schematic view of a cross-section of a display medium 21.

FIG. 2 is a diagram that schematically shows a cross-section of the display medium 21 of the display apparatus 2. The display medium 21 has a configuration in which substrate layers, conductive layers, display layers, colored layers, photosensitive layers, and laminate layers are stacked, and each layer has a rectangular shape. Also, a touch panel 200 is disposed on the surface of the display medium 21. Note that in FIG. 2, the side on which the touch panel 200 is disposed is the side on which a user views an image (display face side), and the side on which a substrate layer 201C is disposed is the side that is irradiated by light output from the writing apparatus 1 (writing face side).

The transparent touch panel 200 is a position input apparatus that, upon an object coming into contact with the surface, outputs a position signal indicating the position of the contact. The touch panel 200 is connected to a terminal 200A that outputs the position signal. When the tip of the writing utensil 3 comes into contact with the surface of the touch panel 200, a position signal indicating the position of the contact with the writing utensil 3 is output from the terminal 200A.

Substrate layers 201A, 201B, and 201C are layers that protect the shape of and maintain the portion in which an image is displayed. The substrate layer 201A is in contact with the touch panel 200, and the substrate layer 201C is exposed to the surface of the display apparatus 2 on the writing face side. Also, the substrate layer 201B is provided between conductive layers 202B and 202C, and fulfills the role of insulating the conductive layers 202B and 202C. Note that although the substrate layers are formed from polyethylene terephthalate that transmits light in the present exemplary embodiment, the material forming the substrate layers is not limited to polyethylene terephthalate. Another material that is transparent and has insulation properties may be used.

Conductive layers 202A, 202B, 202C, and 202D are formed from indium tin oxide in the present exemplary embodiment, and these layers are transparent and transmit light, and furthermore are conductive. Note that the material forming the conductive layers is not limited to indium tin oxide, and another material that is transparent and transmits light, and also is conductive may be used.

The conductive layer 202A is in contact with the writing face side of the substrate layer 201A, and the conductive layer 202B is in contact with the display face side of the substrate layer 201B. Also, the conductive layer 202C is in contact with the writing face side of the substrate layer 201B, and the conductive layer 202D is in contact with the display face side of the substrate layer 201C.

Furthermore, the conductive layer 202A is connected to a terminal 203A, the conductive layer 202B is connected to a terminal 203B, the conductive layer 202C is connected to a terminal 203C, and the conductive layer 202D is connected to a terminal 203D. The terminals 203A to 203D are terminals to which a voltage is applied, and are disposed so as to be exposed to the outside of the display apparatus 2.

A display layer 204BG that is in contact with the writing face side of the conductive layer 202A, and a display layer 204R that is in contact with the writing face side of the conductive layer 202C are both layers formed from cholesteric liquid crystal and a resin that transmits light, and the display layers 204BG and 204R have configurations in which the cholesteric liquid crystal is dispersed in the resin.

In the cholesteric liquid crystal, the liquid crystal molecules are twisted in a spiral orientation, and the orientation changes according to an electric field. The orientation of the liquid crystal molecules changes between a state in which a specified wavelength of incident light is reflected and a state in which light is transmitted. Note that in the present exemplary embodiment, the cholesteric liquid crystal in the display layer 204BG has been adjusted so as to reflect blue-green light, and the cholesteric liquid crystal in the display layer 204R has been adjusted so as to reflect red light.

Also, the resin used in the display layers has the functions of holding the cholesteric liquid crystal and suppressing the flow of the liquid crystal (changing of an image), and the resin is a polymer material that does not dissolve in a liquid crystal material, and whose solvent is a liquid that is incompatible with liquid crystal. Furthermore, the resin used in the display layers has a strength capable of withstanding external force and exhibits transmissivity with respect to light.

A photosensitive layer 205R that is in contact with the display face side of the conductive layer 202B, and a photosensitive layer 205BG that is in contact with the display face side of the conductive layer 202D are layers in which a photoelectric effect occurs. In the present exemplary embodiment, the photosensitive layers 205R and 205BG each have charge generating layers 2051 and 2053 and a charge transporting layer 2052, and each have a structure in which the charge generating layer 2051, the charge transporting layer 2052, and the charge generating layer 2053 are stacked in the stated order.

When the photosensitive layers are irradiated by light, the resistance value decreases in the portion irradiated by light. The voltage applied to the conductive layers that sandwich the display layers and the photosensitive layers is divided between the display layers and the photosensitive layers, and when the resistance value of the photosensitive layers decreases, the voltage division ratio changes, and the voltage applied to the display layers increases.

The charge generating layers 2051 and 2053 are layers that generate photocarriers upon absorbing light. The charge generating layer 2051 determines the amount of photocarriers that flow from the conductive layer on the display face side toward the conductive layer on the writing face side, and the charge generating layer 2053 determines the amount of photocarriers that flow from the conductive layer on the writing face side toward the conductive layer on the display face side.

Each charge transporting layer 2052 functions as a layer in which implanted photocarriers that have been generated by the charge generating layers drift toward an electric field generated by the voltage applied to the conductive layers.

In the present exemplary embodiment, dibromoanthoanthrone is used as the red charge generating substance in the charge generating layers of the photosensitive layer 205R, and titanyl phthalocyanine is used as the blue-green charge generating substance in the charge generating layers of the photosensitive layer 205BG. However, the charge generating substances are not limited to these substances, and other substances may be used.

A colored layer 206R positioned so as to be in contact with the display face side of the photosensitive layer 205R is a Layer that absorbs the same wavelength of light as the wavelength of light absorbed by the charge generating layers of the photosensitive layer 205R. The colored layer 206R is colored by an inorganic pigment or an organic dye or organic pigment so as to be the complementary color of the color of light reflected by the display layer 204BG.

Also a colored layer 206BG positioned so as to be in contact with the display face side of the photosensitive layer 205BG is a layer that absorbs the same wavelength of light as the wavelength of light absorbed by the charge generating layers of the photosensitive layer 20513G. The colored layer 206BG is colored by an inorganic pigment or an organic dye or organic pigment so as to be the complementary color of the color of light reflected by the display layer 204R.

A laminate layer 207 is provided between the colored layer 206R and the display layer 204BG, and another laminate layer 207 is provided between the colored layer 206BG and the display layer 204R. These laminate layers 207 are provided in order to fulfill the role of an adhesive and an unevenness absorber when the display layers are laminated to the colored layers. The laminate layers 207 are formed from a polymer material having a low glass transition point, and the material forming the laminate layers 207 is selected to be a material that enables causing the display layers and the photosensitive layers to be adhered in close contact with each other with the use of heat or pressure. The laminate layers 207 also have transmissivity with respect to at least light that is to be incident thereon.

One example of a material used in the laminate layers 207 is an adhesive polymer material (e.g., urethane resin, epoxy resin, acrylic resin, or silicone resin).

In the display medium 21 having this configuration, when the initial state (before a voltage is applied) of the cholesteric liquid crystal in the display layer is the planar phase, the state changes from the planar phase to the focal conic phase to the homeotropic phase in the stated order as the applied voltage increases. When the initial state is the focal conic phase, the state changes from the focal conic phase to the homeotropic phase in the stated order as the applied voltage increases.

If the voltage is removed when the cholesteric liquid crystal is in the focal conic phase state, the focal conic phase state is maintained, and if the voltage is removed when the cholesteric liquid crystal is in the homeotropic phase state, the state changes from the homeotropic phase to the planar phase, and the planar phase state is maintained.

Figure 3:
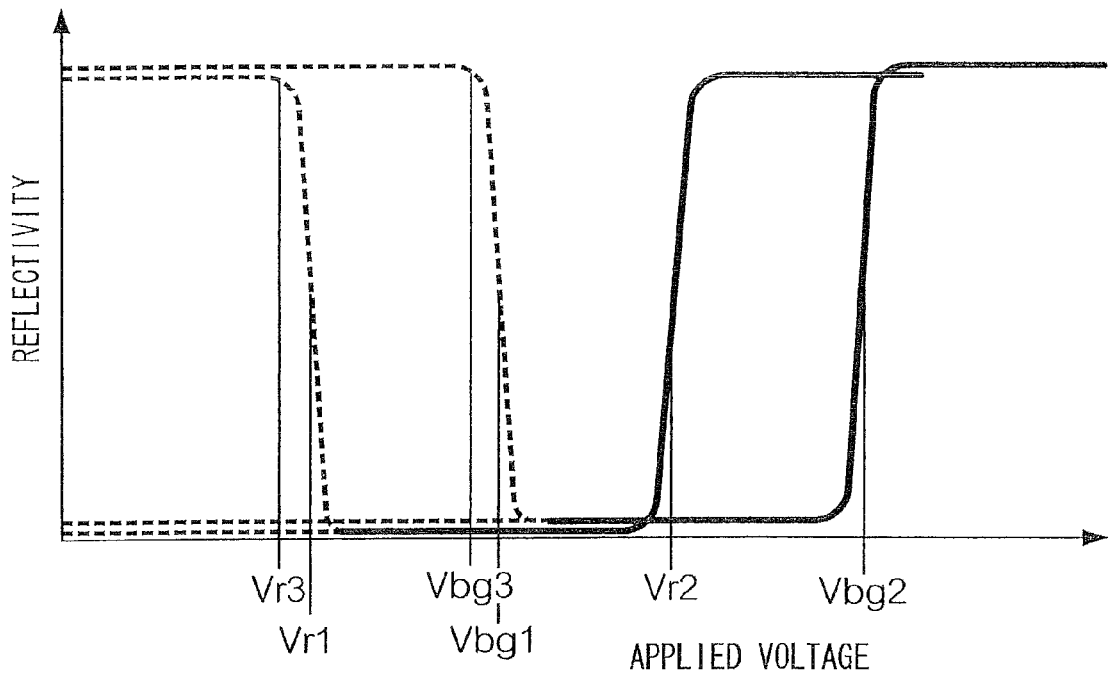
FIG. 3 is a diagram showing a relationship between a voltage applied to a display layer and a reflectivity of the display layer.

FIG. 3 is a diagram showing a relationship between the voltage applied to the display layers via the conductive layers and photosensitive layers, and the reflectivity of light in the display layers. Assuming that Vbg1 is the voltage threshold value when there is a change from the planar phase to the focal conic phase in the display layer 204BG, and that Vbg2 is the voltage threshold value when there is a change from the focal conic phase to the homeotropic phase, if the voltage applied via the conductive layers and photosensitive layers is greater than or equal to Vbg2 before the voltage removal, the cholesteric liquid crystal enters the planar phase and reflects the blue-green component of external light after the voltage removal.

On the other hand, if the voltage applied via the conductive layers and photosensitive layers is between Vbg1 and Vbg2 before the voltage removal, the cholesteric liquid crystal enters the focal conic phase and transmits external light after the voltage removal.

Also, assuming that Vr1 is the voltage threshold value when there is a change from the planar phase to the focal conic phase in the display layer 204R, and that Vr2 is the voltage threshold value when there is a change from the focal conic phase to the homeotropic phase, if the voltage applied via the conductive layers and photosensitive layers is greater than or equal to Vr2 before the voltage removal, the cholesteric liquid crystal enters the planar phase and reflects the red component of external light after the voltage removal.

On the other hand, if the voltage applied via the conductive layers and photosensitive layers is between Vr1 and Vr2 before the voltage removal, the cholesteric liquid crystal enters the focal conic phase and transmits external light after the voltage removal.

Note that although the cholesteric liquid crystal according to the present exemplary embodiment maintains a stabilized phase state while a voltage is not being applied, the fact that the change in phase state during the application of a voltage occurs in short time period is a characteristic feature. In order to change the orientational state of the cholesteric liquid crystal and furthermore stabilize the orientational state, it is necessary to apply a voltage to the display layers for greater than or equal to a predetermined time period when changing the orientational state.

Figure 4:
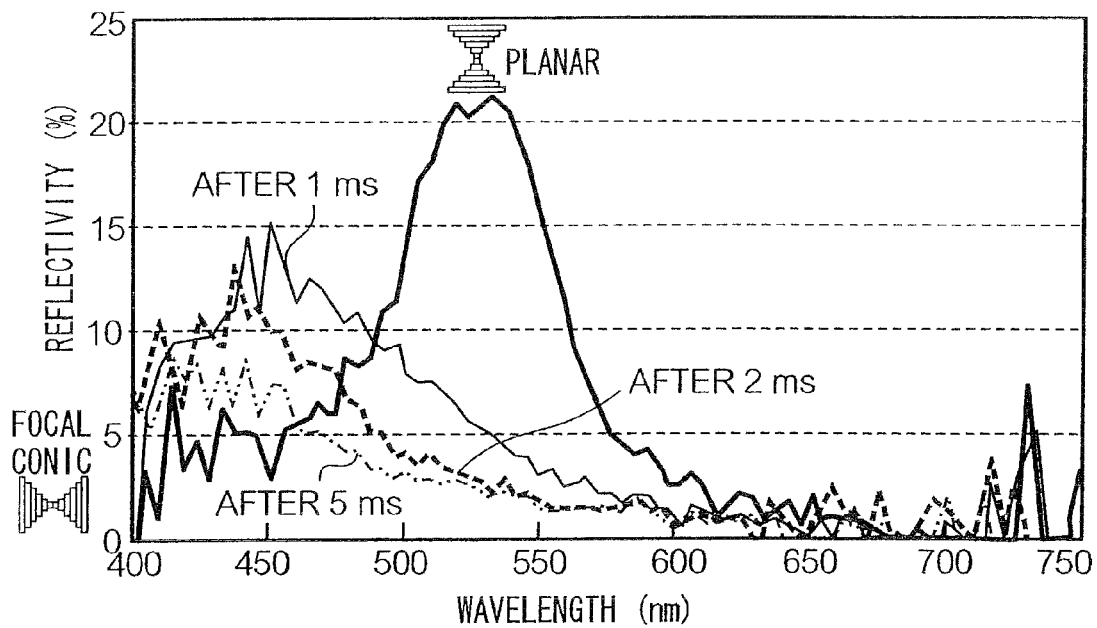
FIG. 4 is a diagram for describing changes in the orientational state of cholesteric liquid crystal when a voltage is applied to a display layer.
Figure 5:
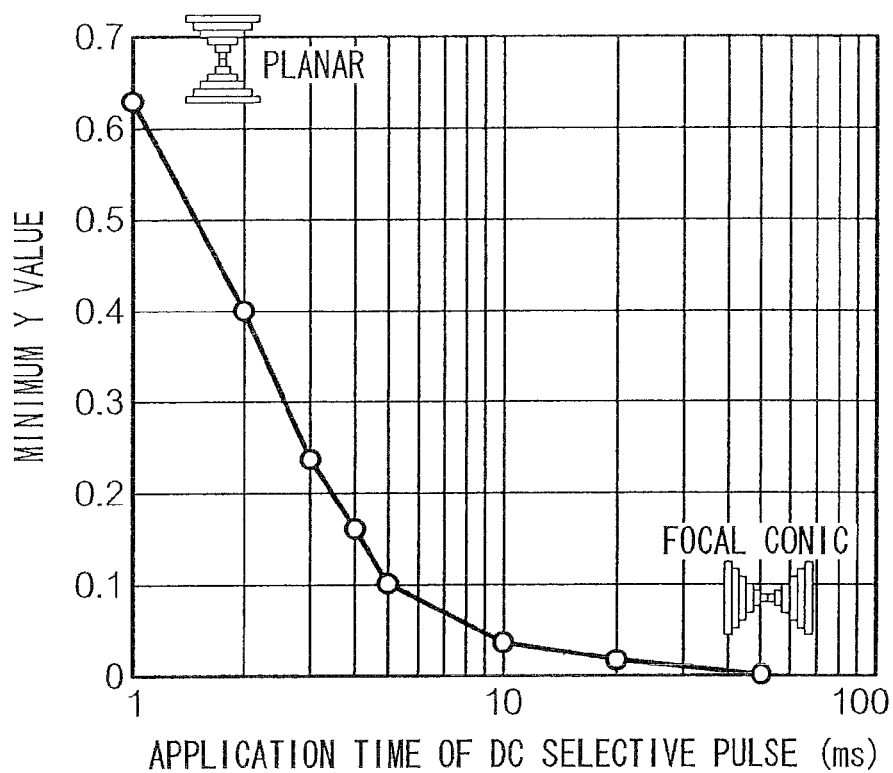
FIG. 5 is a diagram for describing a time period required to change the orientational state.

FIG. 4 is a diagram for describing changes in the orientational state of the cholesteric liquid crystal when a voltage is applied to the display layers, and FIG. 5 is a diagram for describing the time period required to change the orientational state.

As one example, as shown in FIG. 4, in the cholesteric liquid crystal according to the present exemplary embodiment, when a voltage between Vbg1 and Vbg2 is applied while the cholesteric liquid crystal in the display layer 204BG is in the planar phase, the orientational state rapidly (in several ms) changes from a reflective state due to the planar phase to a transmissive state due to the transitional focal conic phase. However, if the voltage application time is a period of several milliseconds, the focal conic phase is not stable after the voltage has been removed, and the orientational state returns to the planar phase, and therefore the written image disappears after the voltage removal.

Also, as shown in FIG. 5, it is necessary for the voltage application time to be greater than or equal to several tens of milliseconds in order to change the orientational state from the planar phase to the focal conic phase and furthermore stabilize the orientational state, and therefore in the present exemplary embodiment, a voltage is applied for a period of greater than or equal to several tens of ms in a portion in which the orientational state is to be changed.

Note that the voltage application time required to change the orientational state and furthermore stabilize the orientational state is not limited to being several tens of milliseconds, but rather the voltage application time is to be appropriately adjusted according to the type of cholesteric liquid crystal that is used.

1-2. Configuration of Writing Apparatus 1

Figure 6:
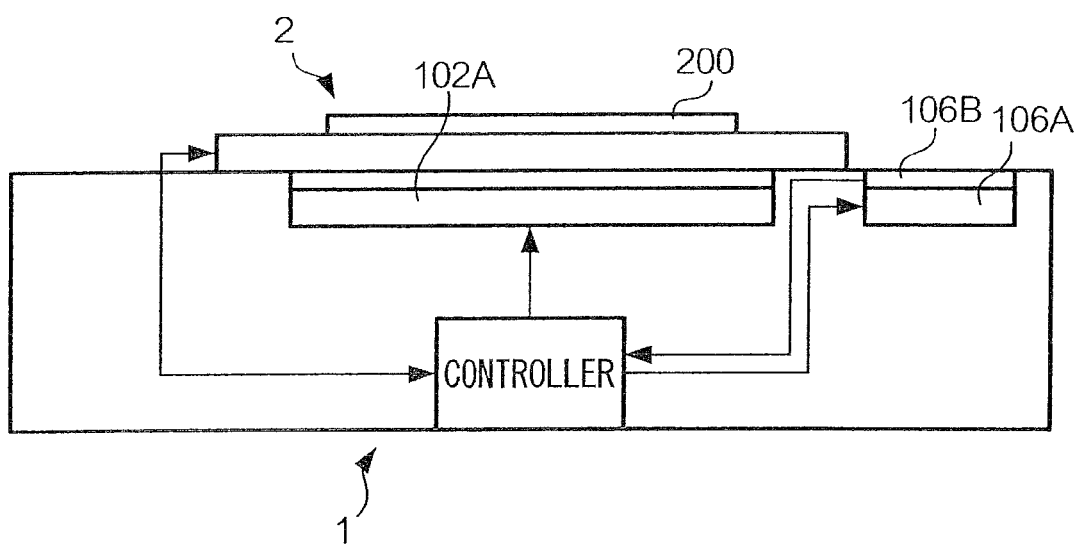
FIG. 6 is an internal schematic view of a writing apparatus 1.
Figure 7:
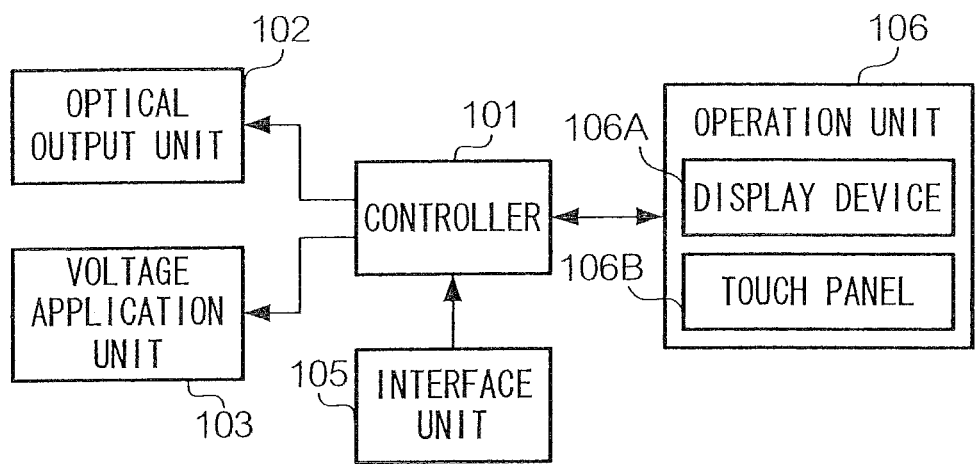
FIG. 7 is a block diagram showing a hardware configuration of the writing apparatus 1.

FIG. 6 is an internal schematic diagram of the writing apparatus 1, and FIG. 7 is a block diagram showing a hardware configuration of the writing apparatus 1.

A controller 101 has a so-called microcomputer that includes a CPU (Central Processing Unit), a ROM (Read Only Memory), a RAM (Random Access Memory), an input port, an output port, and the like. A control program for controlling units is stored in the ROM, and elements in the writing apparatus 1 are controlled when the control program is executed by the CPU. Also, when the control program is executed, a function for controlling the display medium 21 according to the position of the writing utensil 3 and displaying an image on the display apparatus 2 is realized.

A voltage application unit 103 includes a terminal that is connected to the terminal 203A, a terminal that is connected to the terminal 203B, and a circuit that applies a pulse signal to the conductive layers 202A and 202B with use of these terminals. The voltage application unit 103 also includes a terminal that is connected to the terminal 203C and a terminal that is connected to the terminal 203D, and the voltage application unit 103 applies a pulse signal to the conductive layers 202C and 202D with use of these terminals.

An interface unit 105 includes a terminal that is connected to the terminal 200A and receives a signal from the touch panel 200, and the interface unit 105 supplies the signal output from the touch panel 200 to the controller 101.

An operation unit 106 includes a display device 106A that displays an image (e.g., a liquid crystal display or organic EL (Electro Luminescence) display), and a touch panel 106B that is transparent and disposed on the surface of the display device 106A. Under the control of the controller 101, the display device 106A displays an image used for operating the writing apparatus 1. Also, the touch panel 106B outputs, to the controller 101, a signal indicating a position touched by the user.

An optical output unit 102 includes a liquid crystal display 102A, and the liquid crystal display 102A includes a transmissive-type liquid crystal panel having multiple pixels that include red, green, and blue color pixels, and a backlight that functions as a light source. Light output from the backlight passes through the liquid crystal panel and is irradiated onto the writing face side of the display apparatus 2 that is fixed over the liquid crystal panel. Note that the pixels that output light in the optical output unit 102 are controlled by the controller 101.

It should also be noted that the controller 101 in the present exemplary embodiment has pre-stored the position of each pixel in the liquid crystal display 102A that outputs light in association with a corresponding position on the touch panel 200. Upon receiving a position signal from the touch panel 200, the controller 101 specifies the position of a pixel that corresponds to the position indicated by the position signal, and controls the liquid crystal display 102A so that light is output from the specified pixel. For this reason, when the display apparatus 2 and the writing apparatus 1 are electrically connected, the display apparatus 2 is fixed at a predetermined position on the writing apparatus 1.

Also, in the case of causing light to be output from a pixel in the liquid crystal display 102A in accordance with a position signal, the pixel outputs light for only a predetermined time period that is required to change the orientational state of the cholesteric liquid crystal and furthermore stabilize the orientational state, and the pixel stops outputting light when the predetermined time period has elapsed.

The following describes the reason why the output of light from the pixel is stopped after a certain time period.

Figure 8:
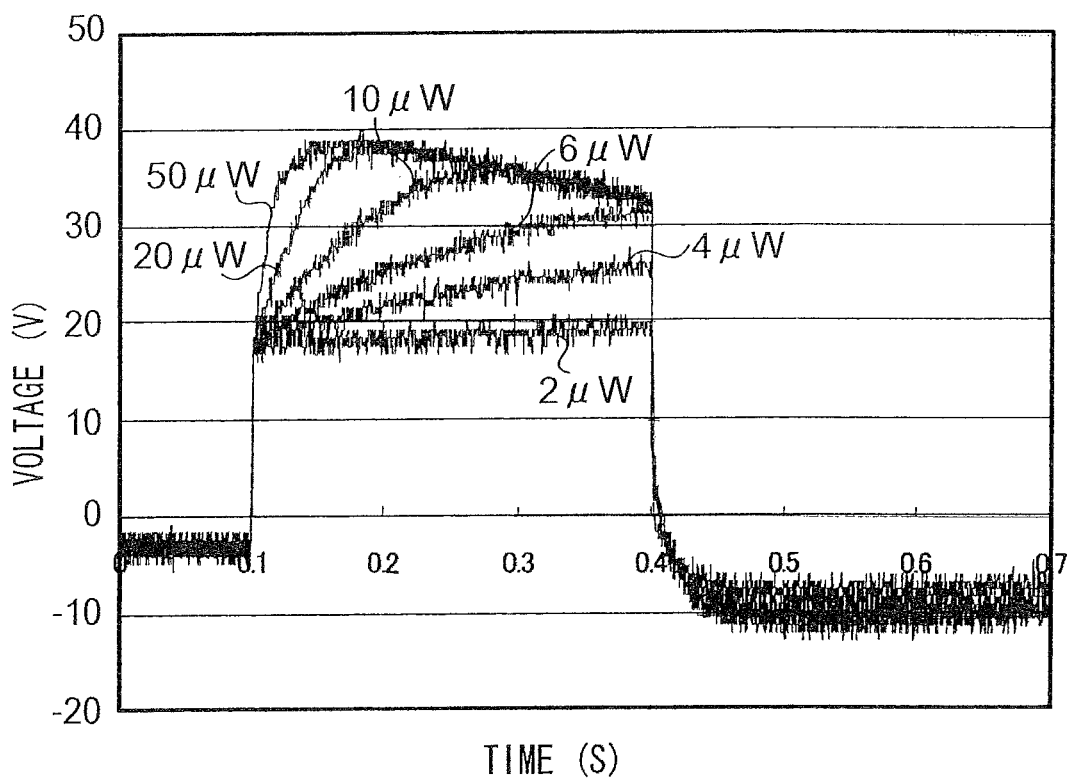
FIG. 8 is a diagram showing a relationship between a voltage applied to a display layer and a time period during which light is irradiated onto a photosensitive layer.

FIG. 8 is a graph showing a relationship between the voltage applied to the display layer 204BG when various intensities of light (2, 4, 6, 10, 20, 50 μW (micro watts)) shown in the figure are irradiated onto the photosensitive layer 205R, and the time period the light is irradiated onto the photosensitive layer 205R, while a constant voltage is being applied between the conductive layers 202A and 202B.

When light is irradiated onto the photosensitive layer 205R while a constant voltage is being applied between the conductive layers 202A and 202B (point 0.1 seconds in FIG. 8), photocarriers are generated in the photosensitive layer 205R and the resistance value of the photosensitive layer 205R decreases, the voltage applied to the display layer 204BG then increases, and when this voltage exceeds Vr1, the orientational state of the cholesteric liquid crystal in the display layer 204BG changes. However, as the irradiation of light continues, the generation of photocarriers begins to decrease due to the accumulation of space charge (e.g., point 0.15 seconds when the optical output is 50 μW (micro watts)), and as shown in FIG. 8, the voltage applied to the display layer 204BG begins to decrease.

Since photocarriers accumulated as space charge have a negative influence in the next case of changing the orientational state of the cholesteric liquid crystal, the output of light from the pixel is stopped before the accumulation of photocarriers as space charge begins. Note that the time period for which light is output from a pixel is to be appropriately adjusted according to the type of cholesteric liquid crystal and the intensity of light that is output from the pixel.

1-3. Operations of the Exemplary Embodiment

The following describes operations of the present exemplary embodiment. Note that the following description pertains to operations in the case of causing the display medium 21 to display an image with use of the writing utensil 3.

First, the user fixes the display apparatus 2 at a predetermined position on the writing apparatus 1 as shown in FIGS. 1 and 6, and thus the terminals of the voltage application unit 103 are electrically connected to the terminals 203A to 203D, and the interface unit 105 is connected to the terminal 200A. As a result, a voltage can be applied from the writing apparatus 1 to the conductive layers 202A to 202D via the terminals 203A to 203D, and a signal output from the touch panel 200 can be received by the controller 101.

Figure 10:
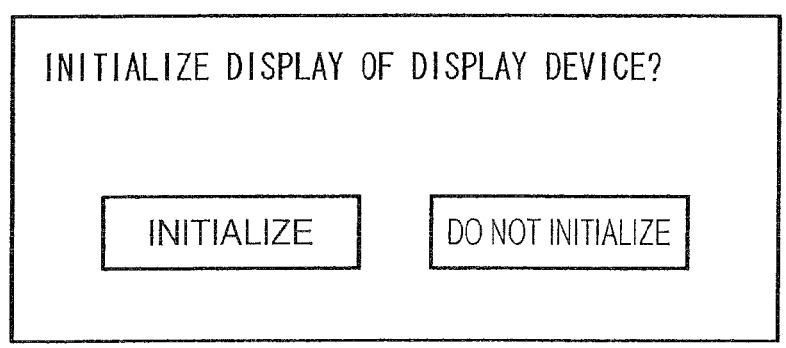
FIG. 10 is a diagram showing an exemplary screen displayed by a display device 106A.

When the writing apparatus 1 is electrically connected to the display apparatus 2, the screen shown in FIG. 10 is displayed on the display device 106A. Here, if the user of the writing apparatus 2 operates the touch panel 106B and touches a portion in which "Initialize" is displayed, the controller 101 controls the voltage application unit 103 and the optical output unit 102, and the orientational state of the cholesteric liquid crystal in the display layers 204BG and 204R is set to the planar phase.

Figure 9:
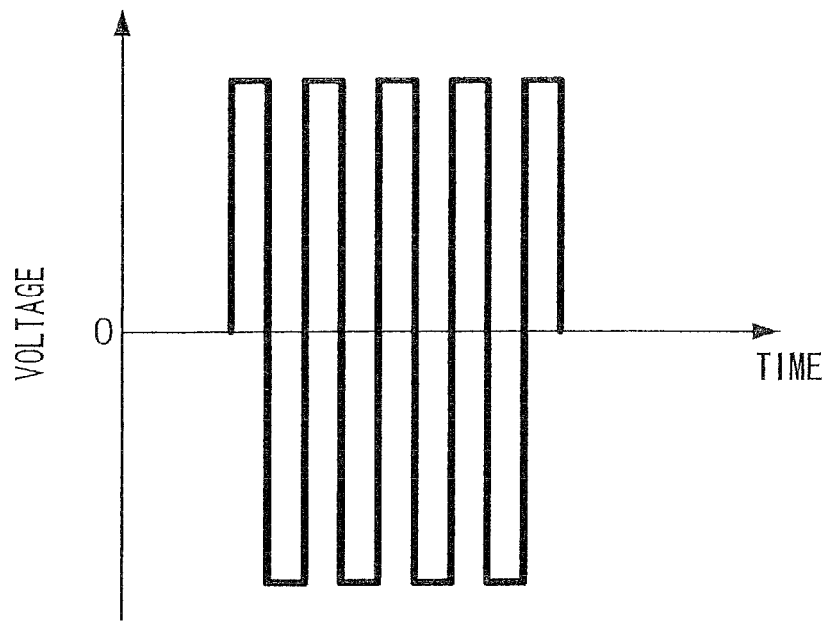
FIG. 9 is a diagram showing the waveform of a signal output by a voltage application unit 103.

Specifically, first the liquid crystal display 102A is controlled by the controller 101, and the backlight of the liquid crystal display 102A is extinguished. Next, the voltage application unit 103 applies a signal having the alternating pulse shape shown in FIG. 9 (hereinafter, called a pulse signal) to the terminals 203A and 203B. Here, the pulse voltage is set so that the voltage applied to the display layer 204BG becomes greater than or equal to Vbg2, and the orientational state of the display layer 204BG enters the homeotropic phase. After the orientational state has entered the homeotropic phase, the application of the pulse signal is stopped, the orientational state of the display layer 204BG then enters the planar phase, and the display layer 204BG enters a state of reflecting the blue-green wavelength component of external light.

The voltage application unit 103 also applies a pulse signal to the terminals 203C and 203D. Here, the pulse voltage is set so that the voltage applied to the display layer 204R becomes greater than or equal to Vr2, and the orientational state of the display layer 204R enters the homeotropic phase. After the orientational state has entered the homeotropic phase, the application of the pulse signal is stopped, the orientational state of the display layer 204R then enters the planar phase, and the display layer 204R enters a state of reflecting the red wavelength component of external light.

Here, since the entire face of the display layer 204R reflects red light and the entire face of the display layer 204BG reflects blue-green light, the display medium 21 appears pale yellow when viewed from the display face side due to additive color mixing.

Figure 11:
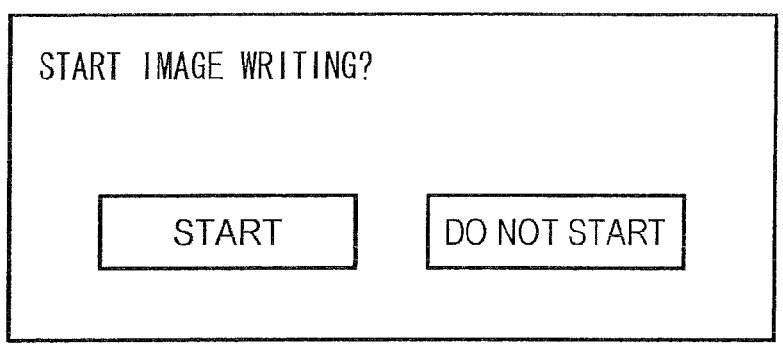
FIG. 11 is a diagram showing an exemplary screen displayed by the display device 106A.

When the process in which the orientational state of the cholesteric liquid crystal in the display layers 204BG and 204R is set to the planar phase has ended, the writing apparatus 1 stops the application of the voltage from the voltage application unit 103 to the terminals 203A to 203D, and as shown in FIG. 11, causes the display device 106A to display a screen via which the user starts the writing of an image.

Here, when the user of the writing apparatus 1 operates the touch panel 106B and touches a portion in which "Start" is displayed, the controller 101 controls the voltage application unit 103 and applies a pulse signal to the terminals 203A to 203D.

Note that the pulse voltage applied from the terminals 203A and 203B is set to Vbg3 (see FIG. 3), which is the voltage that is applied to the display layer 204BG in order to maintain the planar phase, and the pulse voltage applied from the terminals 203C and 203D is set to Vr3 (see FIG. 3), which is the voltage that is applied to the display layer 204R in order to maintain the planar phase.

Figure 12:
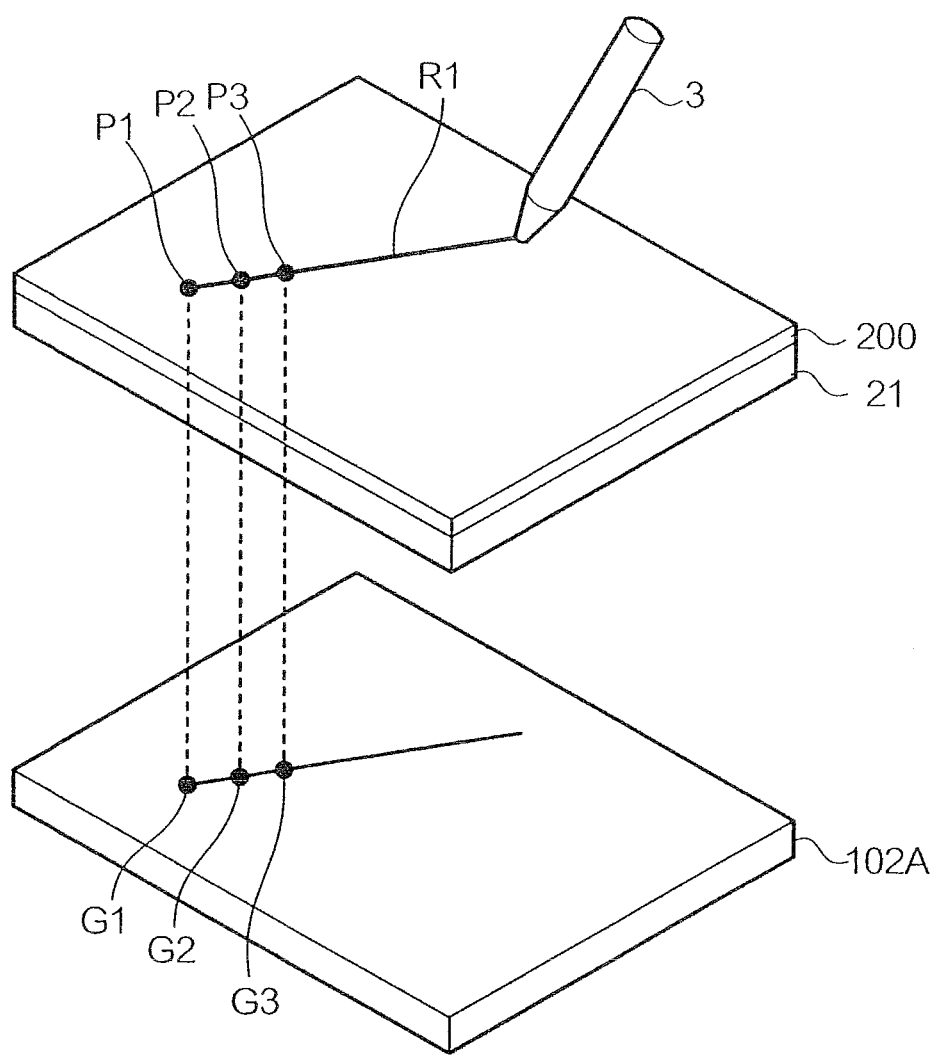
FIG. 12 is a diagram for describing operations of the exemplary embodiment.

Then, when the user brings the writing utensil 3 into contact with the touch panel 200 and in this state moves the writing utensil 3 along a route R1 shown in FIG. 12, a position signal indicating the positions touched by the writing utensil 3 is output from the touch panel 200 and supplied to the controller 101. Upon receiving the position signal output from the touch panel 200, the controller 101 controls the optical output unit 102 based on the positions indicated by the position signal.

For example, if the touch panel 200 supplies a position signal indicating the position of a point P1 on the route R1 to the controller 101, the controller 101 specifies a pixel C1 below the point P1 on the liquid crystal display 102A based on the position signal, and controls the liquid crystal display 102A so that light is output from the pixel G1.

FIGS. 13A to 13C are diagrams showing examples of pixels outputting light, and black circles in these diagrams indicate pixels that are outputting light. As shown in FIG. 13A, only the pixel G1 is outputting light at this point in time.

Note that in the present exemplary embodiment, the pixels that output light in the liquid crystal display 102A are controlled so as to only output light for a predetermined time period (e.g., 50 ms) that is required to change the orientational state of the cholesteric liquid crystal and furthermore stabilize the orientational state, and to stop outputting light when the predetermined time period has elapsed.

The light that is output from the pixels in the liquid crystal display 102A enters the display medium 21 from the writing face side. The red component of the light output from the pixel then causes a photoelectric effect to occur in the photosensitive layer 205BG. Then, in a portion of the display layer 204R positioned above the area where the photoelectric effect occurred in the photosensitive layer 205BG, the applied voltage increases to a voltage between Vr1 and Vr2, the orientational state of the cholesteric liquid crystal then changes to the focal conic phase, and this portion enters a state of transmitting red light.

Also, the blue-green component of the light output from the pixel causes a photoelectric effect to occur in the photosensitive layer 205R. Then, in a portion of the display layer 204BG positioned above the area where the photoelectric effect occurred in the photosensitive layer 205R, the applied voltage increases to a voltage between Vbg1 and Vbg2, the orientational state of the cholesteric liquid crystal then changes to the focal conic phase, and this portion enters a state of transmitting blue-green light.

Here, in a portion of the display medium 21 positioned below the point P1, the blue-green light that entered from the display face side passes through the display layer 204BG, and thereafter is absorbed by the colored layer 206R. Also, the red light that entered from the display face side passes through the display layer 204BG, and thereafter passes through the display layer 204R and is absorbed by the colored layer 206R. In other words, since external light from the display face side that arrives at the portion corresponding to the point P1 is not reflected by the display medium 21, the portion below the point P1 appears black to the user.

Next, when the writing utensil 3 is moved to the position at a point P2, and the touch panel 200 supplies a position signal indicating the position of the point P2 on the route to the controller 101, the controller 101 specifies a pixel G2 below the point P2 on the liquid crystal display 102A based on the position signal, and controls the liquid crystal display 102A so that light is output from the pixel G2. Note that if the time period for which the pixel G1 has been outputting light at this point in time is less than the predetermined time period, both the pixel G2 and the pixel G1 output light as shown in FIG. 13B.

Similarly to the case of the light output from the pixel G1, when the light output from the pixel G2 arrives at the display medium 21, the portion of the display medium 21 positioned above the pixel G2 appears black to the user.

Furthermore, when the writing utensil 3 is moved to the position at a point P3, and the touch panel 200 supplies a position signal indicating the position of the point P3 on the route to the controller 101, the controller 101 specifies a pixel G3 below the point P3 on the liquid crystal display 102A based on the position signal, and controls the liquid crystal display 102A so that light is output from the pixel G3. Here, when the time period for which the pixel G1 has been outputting light exceeds the predetermined time period, the output of light from the pixel G1 is stopped as shown in FIG. 13C. Also, if the time period for which the pixel G2 has been outputting light is less than the predetermined time period, both the pixel G3 and the pixel G2 output light as shown in FIG. 13C.

Similarly to the case of the light output from the pixel G1, when the light output from the pixel G3 arrives at the display medium 21, the portion of the display medium 21 positioned above the pixel G3 appears black to the user.

Then, after moving the writing utensil 3 along the route R1, if the user performs an operation on the touch panel 106B that instructs the end of image writing, by separating the writing utensil 3 from the touch panel 200, the backlight of the liquid crystal display 102A is extinguished. At this point in time, the portion of the display medium 21 along the route R1 has been irradiated with light for at least a certain time period and the orientational state of the cholesteric liquid crystal in this portion has entered the focal conic phase, and thus this portion appears as an image of a black line.

In this way, in the present exemplary embodiment, when the writing utensil 3 is moved on the display medium 21, the reflective state due to the planar phase immediately changes to the transmissive state due to the transitional focal conic phase in accordance with the movement route of the tip of the writing utensil 3, and an image written with use of the writing utensil 3 appears to the user without delay. Furthermore, on the movement route of the writing utensil 3, even after the writing utensil 3 has moved, light continues to be irradiated on the display medium 21 for a time period required to change the orientational state of the cholesteric liquid crystal and furthermore stabilize the focal conic phase state. Therefore, even if the writing utensil 3 is moved rapidly, the image is displayed according to the movement route of the writing utensil 3 after the voltage removal.

2. Modifications

Although an exemplary embodiment of the present invention has been described above, the present invention is not limited to the above-described exemplary embodiment. The present invention can be implemented by various other embodiments. For example, the present invention may be implemented by the following examples of modifications on the exemplary embodiment described above. Note that various combinations of the exemplary embodiment described above and the modifications described below are also applicable.

A configuration is possible in which, in the writing apparatus 1, from the start to the end of image writing by the user, positions indicated by the position signal are stored in a nonvolatile memory or a RAM, and if a position signal indicating the same position as a stored position is supplied to the controller 101, light is not output from the pixel that corresponds to that position. According to this configuration, even if the writing utensil 3 stops at a certain place, light is not continuously output from the pixel corresponding to that position. In other words, since photocarriers are not accumulated as space charge, there is no negative influence on the next case of changing the orientational state of the cholesteric liquid crystal.

Note that a configuration is possible in which, from the start to the end of the image writing by the user, the positions of pixels that have output light once are stored instead of the positions indicated by the position signal, and light is not output again from pixels at the stored positions.

A configuration is also possible in which the control for not irradiating light at the same position twice is performed in a period during which the position signal is received by the controller 101, that is to say, in a period during which the controller 101 receives the position signal and controls the optical output unit 102.

In the writing apparatus 1, the irradiation of light onto the writing face side of the display medium 21 is not limited to being realized by the liquid crystal display 102A. A configuration is possible in which light emitting diodes are arranged in a plane, and the light emitting diodes are lit according to the position signal, thus irradiating light onto the writing face side. A configuration is also possible in which the liquid crystal display 102A is replaced with a display apparatus utilizing a substance that emits light upon the application of a voltage, such as an organic EL display. Even in the case of a liquid crystal display, it is possible to use a monochrome type of liquid crystal display having a light source that is a backlight whose light can be switched between the colors red, green, and blue, and having pixels that transmit or do not transmit light.

Although there are two display layers in the exemplary embodiment described above, the display medium 21 may have a configuration including three display layers, namely a display layer that reflects red light, a display layer that reflects green light, and a display layer that reflects blue light. Alternatively, the display medium 21 may include one display layer.

In the configuration including three display layers, one of the display layers may be positioned between the conductive layers 202C and 202D, and the remaining two display layers may be positioned between the conductive layers 202A and 202B.

Also, the light reflected by the display layers is not limited to the light described in the above exemplary embodiment and modifications. Other wavelengths of light (other colors of light) may be reflected.

Although the touch panel for detecting the position of the writing utensil 3 is disposed on the surface of the display medium 21 in the exemplary embodiment described above, a configuration is possible in which the touch panel for detecting the position of the writing utensil 3 is disposed on the writing apparatus 1 instead of on the display apparatus 2.

In the case of disposing the touch panel on the writing apparatus 1, a configuration is possible in which the touch panel is disposed on the surface of the writing apparatus 1 at a distance from the liquid crystal display 102A, and the display apparatus 2 is inserted between the touch panel and the liquid crystal display 102A. According to this configuration, light from the liquid crystal display 102A is irradiated toward the writing face side of the display apparatus 2, and an image can be displayed on the display apparatus 2 by moving the writing utensil 3 on the display face side.

Note that although the position of the writing utensil 3 is detected with use of a touch panel in the exemplary embodiment described above, the configuration for detecting the position of the writing utensil 3 is not limited to a resistive touch panel. The position of the writing utensil 3 may be detected using an electromagnetic induction scheme. In this case, an electromagnetic induction sheet can be disposed on the back face side of the liquid crystal display 102A.

A configuration is also possible in which the writing apparatus 1 is provided with a so-called tablet, the writing utensil 3 is moved on the tablet instead of on the surface of the writing apparatus 2, and the liquid crystal display 102A is controlled according to the position on the tablet.

Although pen-shaped in the exemplary embodiment described above, the writing utensil 3 is not limited to being pen-shaped, and another shape may be used as long as designating a pixel light emission position by coming into contact with the touch panel 200 is possible. A configuration is also possible in which image writing is performed by touching the touch panel 200 with a finger without using the writing utensil 3.

In other words, instead of being limited to the writing utensil 3, the input device in the present detailed description is a broad concept that includes anything for designating a portion in which the display is to be changed.

In the exemplary embodiment described above, when the screen shown in FIG. 11 is displayed and the portion in which "Start" is displayed is touched, image writing using the writing utensil 3 becomes possible. However, a configuration is possible in which, when the process for causing the display layers 204R and 204BG to enter the planar phase has ended, a message such as "An image can now be written" is displayed, and the process for controlling the liquid crystal display 102A upon receiving a position signal is started.

A configuration is also possible in which, in the case of making an addition to an image using the writing utensil 3, when the writing utensil 3 is separated from the touch panel 200 and the signal from the touch panel 200 is no longer supplied to the controller 101, the backlight of the liquid crystal display 102A is extinguished, and when the writing utensil 3 is brought into contact with the touch panel 200 and the signal from the touch panel 200 is supplied to the controller 101, the backlight of the liquid crystal display 102A is lit.

What is claimed is:

1. A writing apparatus having a display face side and a writing face side, the writing apparatus comprising:
a voltage application unit that applies a voltage to conductive layers of a display medium, the display medium including a liquid crystal layer whose orientational state changes according to an applied voltage applied to the liquid crystal layer and a photosensitive layer whose resistance changes according to an irradiation of light, the liquid crystal layer and the photosensitive layer being between the conductive layers;
an optical output unit that irradiates light from the writing face side through the photosensitive layer toward the liquid crystal layer and the display face side, the voltage application unit applying a constant voltage to the conductive layers when the optical output unit irradiates light through the photosensitive layer, and the resistance of the photosensitive layer changes due to the irradiation of light such that the voltage applied to the liquid crystal layer changes according to an inverse relationship with the resistance of the photosensitive layer, the inverse relationship being to increase the voltage applied to the liquid crystal layer responsive to a decrease in the resistance of the photosensitive layer, and to decrease the voltage applied to the liquid crystal layer responsive to an increase in the resistance of the photosensitive layer; and
a controller that controls the optical output unit so that light is irradiated from the writing face side through the photosensitive layer based on a position signal indicating a position of an input device at the display face side for a time period that is required to change the orientational state of the liquid crystal layer and further stabilize the orientational state, but less than a time wherein an accumulation of photocarriers of the photosensitive layer as a space charge begins by the irradiation of light.

2. The writing apparatus according to claim 1, wherein in a period in which the position signal continues to indicate a same position, the controller controls the optical output unit so that light is not irradiated again.

3. The writing apparatus according to claim 1, wherein the display of the display medium is configured to change according to the light irradiated toward the specified position on the display medium from the optical output unit.

4. The writing apparatus according to claim 1, further comprising:
   a plurality of color layers formed in the display medium; and
   at least a first cholesteric liquid crystal material and a second cholesteric liquid crystal material, wherein
   at least two color layers of the plurality of color layers being respectively formed on each of two opposing surfaces of the first cholesteric liquid crystal material such that one of the two color layers is formed between the first cholesteric liquid crystal material and the second cholesteric liquid crystal material.

5. A method for optical writing to a display medium, the method comprising:
   irradiating light from a writing face side of the display medium through a photosensitive layer of the display medium based on a position signal indicating a position of an input device at a display face side of the display medium for a time period that is required to change an orientational state of a liquid crystal layer and further stabilize the orientational state, but less than a time wherein an accumulation of photocarriers of a photosensitive layer of the display medium as a space charge begins by the irradiation of light; and
   applying a constant voltage to conductive layers of the display medium when the light is irradiated through the photosensitive layer, the liquid crystal layer and the photosensitive layer being between the conductive layers, and a resistance of the photosensitive layer changes due to the irradiation of light such that the voltage applied to the liquid crystal layer changes according to an inverse relationship with the resistance of the photosensitive layer, the inverse relationship being to increase the voltage applied to the liquid crystal layer responsive to a decrease in the resistance of the photosensitive layer, and to decrease the voltage applied to the liquid crystal layer responsive to an increase in the resistance of the photosensitive layer.

6. The method of claim 5, wherein in a period in which the position signal continues to indicate a same position, the controller controls the optical output unit so that light is not irradiated again.

7. A non-transitory computer readable medium storing a program causing a computer to execute a process for optical writing to a display medium, the process comprising:
   irradiating light from a writing face side of the display medium through a photosensitive layer of the display medium based on a position signal indicating a position of an input device at a display face side of the display medium for a time period that is required to change an orientational state of a liquid crystal layer and further stabilize the orientational state, but less than a time wherein an accumulation of photocarriers of a photosensitive layer of the display medium as a space charge begins by the irradiation of light; and
   applying a constant voltage to conductive layers of the display medium when the light is irradiated through the photosensitive layer, the liquid crystal layer and the photosensitive layer being between the conductive layers, and a resistance of the photosensitive layer changes due to the irradiation of light such that the voltage applied to the liquid crystal layer changes according to an inverse relationship with the resistance of the photosensitive layer, the inverse relationship being to increase the voltage applied to the liquid crystal layer responsive to a decrease in the resistance of the photosensitive layer, and to decrease the voltage applied to the liquid crystal layer responsive to an increase in the resistance of the photosensitive layer.

8. The non-transitory computer readable medium of claim 7,
wherein in a period in which the position signal continues to indicate a same position, the controller controls the optical output unit so that light is not irradiated again.

9. The writing apparatus according to claim 1, wherein the orientational state is one of a plurality of reflectivity phases of the liquid crystal layer, and the voltage application unit controls the applied voltage such that (i) during the time period, a level of the applied voltage changes the orientational state of the liquid crystal layer to a corresponding one of the plurality of reflectivity phases, and (ii) removes the applied voltage at the end of the time period to stabilize the orientational state of the liquid crystal layer in one of the plurality of reflectivity phases.

\* \* \* \* \*